United States Patent
Okazaki et al.

(10) Patent No.: US 12,058,475 B2
(45) Date of Patent: Aug. 6, 2024

(54) VIDEO DISPLAY SYSTEM, VIDEO CONVERSION DEVICE, AND VIDEO DISPLAY METHOD

(71) Applicant: Panasonic Intellectual Property Management Co., Ltd., Osaka (JP)

(72) Inventors: Yoshinori Okazaki, Osaka (JP); Yoshito Tanaka, Kyoto (JP); Takashi Yamada, Osaka (JP); Daizaburo Matsuki, Osaka (JP); Yoshifumi Kawaguchi, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/466,563

(22) Filed: Sep. 3, 2021

(65) Prior Publication Data

US 2021/0400230 A1    Dec. 23, 2021

Related U.S. Application Data

(63) Continuation of application No. PCT/JP2020/008046, filed on Feb. 27, 2020.

(30) Foreign Application Priority Data

Mar. 4, 2019    (JP) ................................. 2019-038341

(51) Int. Cl.
*H04N 7/01* (2006.01)
*H04N 5/445* (2011.01)

(52) U.S. Cl.
CPC ............. *H04N 7/012* (2013.01); *H04N 5/445* (2013.01); *H04N 7/013* (2013.01)

(58) Field of Classification Search
CPC ........ H04N 7/012; H04N 5/445; H04N 7/013; H04N 21/43076; H04N 21/440272;
(Continued)

(56) References Cited

U.S. PATENT DOCUMENTS

| 10,004,984 B2 | 6/2018 | Voris et al. | |
| 2005/0030485 A1* | 2/2005 | Oketani | H04N 5/7441 |
| | | | 348/E5.143 |

(Continued)

FOREIGN PATENT DOCUMENTS

| CN | 111124330 | 5/2020 |
| JP | 3-208095 | 9/1991 |

(Continued)

OTHER PUBLICATIONS

International Search Report issued May 19, 2020 in corresponding International Application No. PCT/JP2020/008046.

(Continued)

*Primary Examiner* — Michael Lee
(74) *Attorney, Agent, or Firm* — WENDEROTH, LIND & PONACK L.L.P.

(57) ABSTRACT

The video display system includes a plurality of display devices having mutually different display delay times and a video conversion device that divides an input integrated video signal into a plurality of video signals and respectively outputs the plurality of video signals to the plurality of display devices. At least one of the plurality of video signals is output in a delayed state to make a difference between display timings of the plurality of videos respectively displayed on the plurality of display devices substantially zero, based on the display delay times.

9 Claims, 21 Drawing Sheets

(58) Field of Classification Search
CPC ....... H04N 21/4122; H04N 21/440245; G09G 5/00; G09G 5/12
See application file for complete search history.

(56) References Cited

U.S. PATENT DOCUMENTS

| | | | |
|---|---|---|---|
| 2009/0010620 A1 | 1/2009 | Hatabu | |
| 2010/0039570 A1* | 2/2010 | Shiota | G03B 21/005 |
| | | | 348/748 |
| 2012/0320200 A1* | 12/2012 | Majumder | G06F 3/017 |
| | | | 348/E17.005 |
| 2014/0306966 A1* | 10/2014 | Kuo | G06F 3/1446 |
| | | | 345/522 |
| 2016/0180812 A1* | 6/2016 | Choi | G06F 3/1446 |
| | | | 345/204 |
| 2016/0357493 A1* | 12/2016 | Zerwas | G09G 5/12 |
| 2017/0134690 A1* | 5/2017 | Masumoto | G06F 3/1438 |
| 2018/0117465 A1 | 5/2018 | Voris et al. | |
| 2020/0042275 A1* | 2/2020 | Yueh | G06F 3/147 |
| 2020/0143772 A1* | 5/2020 | Huang | G09G 5/18 |

FOREIGN PATENT DOCUMENTS

| | | |
|---|---|---|
| JP | H10232647 A * | 9/1998 |
| JP | 2001-350759 | 12/2001 |
| JP | 2005184749 A * | 7/2005 |
| JP | 2008-90080 | 4/2008 |
| JP | 2016-116107 | 6/2016 |
| WO | 2007/100044 | 9/2007 |

OTHER PUBLICATIONS

English Translation of Chinese Office Action dated Sep. 28, 2023 for the related Chinese Patent Application No. 202080017946.2.

* cited by examiner

VIDEO DISPLAY SYSTEM, VIDEO CONVERSION DEVICE, AND VIDEO DISPLAY METHOD

BACKGROUND

1. Technical Field

The present disclosure relates to a video display system including a plurality of video display devices having different delay times in video display, and a video conversion device and a video display method included in the video display system.

2. Description of the Related Art

PTL (Patent Literature) 1 discloses an interactive indoor show and a game system which are configured to provide an attractive and immersive multimedia show or presentation in a room. The system disclosed in PTL 1 includes a controller for selectively operating a display device, an image projector, an audio system (such as speakers), and other show components (a light source, fan, mechanical device, and the like).

PTL 1 is U.S. Pat. No. 10,004,984.

SUMMARY

The system in PTL 1 includes a display and a projector. However, the delay times in the video display are different from each other. Accordingly, such a system may cause a difference in display timing between two display videos displayed by the display and the projector, give a sense of discomfort, and impair a feeling of immersion in a show or a game.

In addition, the system disclosed in PTL 1 converts a video signal to be output to each video display device on the basis of the positions of the display and the projector. Accordingly, since a high-performance computer or the like is used to process videos for a plurality of display devices in real time, the cost increases.

The present disclosure provides a low-cost video display system, a video conversion device, and a video display method, which make the time difference between display videos by display devices substantially become zero in the video display system including a plurality of display devices having different display delay times.

The video display system includes a plurality of display devices having mutually different display delay times and a video conversion device that divides an input integrated video signal into a plurality of video signals and respectively outputs the plurality of video signals to the plurality of display devices. At least one of the plurality of video signals is output in a delayed state to make a difference between display timings of the plurality of videos respectively displayed on the plurality of display devices substantially zero, based on the display delay times.

The video conversion device includes a video conversion processor that receives an integrated video signal and divides the integrated video signal into a plurality of video signals respectively corresponding to a plurality of display devices having mutually different display delay times and a delay correction calculator that receives information regarding the display delay times and adjusts output timings of the plurality of video signals to make a difference between the display timings of the plurality of display devices substantially zero, based on the display delay times.

The video display method is a video display method for causing a plurality of display devices having mutually different display delay times to respectively display a plurality of videos. This method includes an information input step of inputting information related to the display delay times and a video output step of outputting a plurality of video signals respectively corresponding to the plurality of videos to make a difference between display timings of the plurality of videos substantially zero, based on the display delay times.

Therefore, according to the video display system, the video conversion device, and the video display method according to the present disclosure, the time difference between the display videos by the plurality of video display devices having different display delay times can be made substantially zero.

DETAILED DESCRIPTION

Hereinafter, exemplary embodiments will be described in detail with appropriate reference to the drawings. However, an unnecessarily detailed description such as a detailed description of already well-known matters and an overlapping description of substantially the same configuration will be sometimes omitted. This is to avoid an unnecessarily redundant description below and to facilitate understanding of a person skilled in the art.

Note that the attached drawings and the following description are provided for those skilled in the art to help sufficient understanding of the present disclosure, and are not intended to limit the subject matter as described in the appended claims.

First Exemplary Embodiment

A first exemplary embodiment will be described below with reference to FIGS. 1 to 4.

Figure 1:
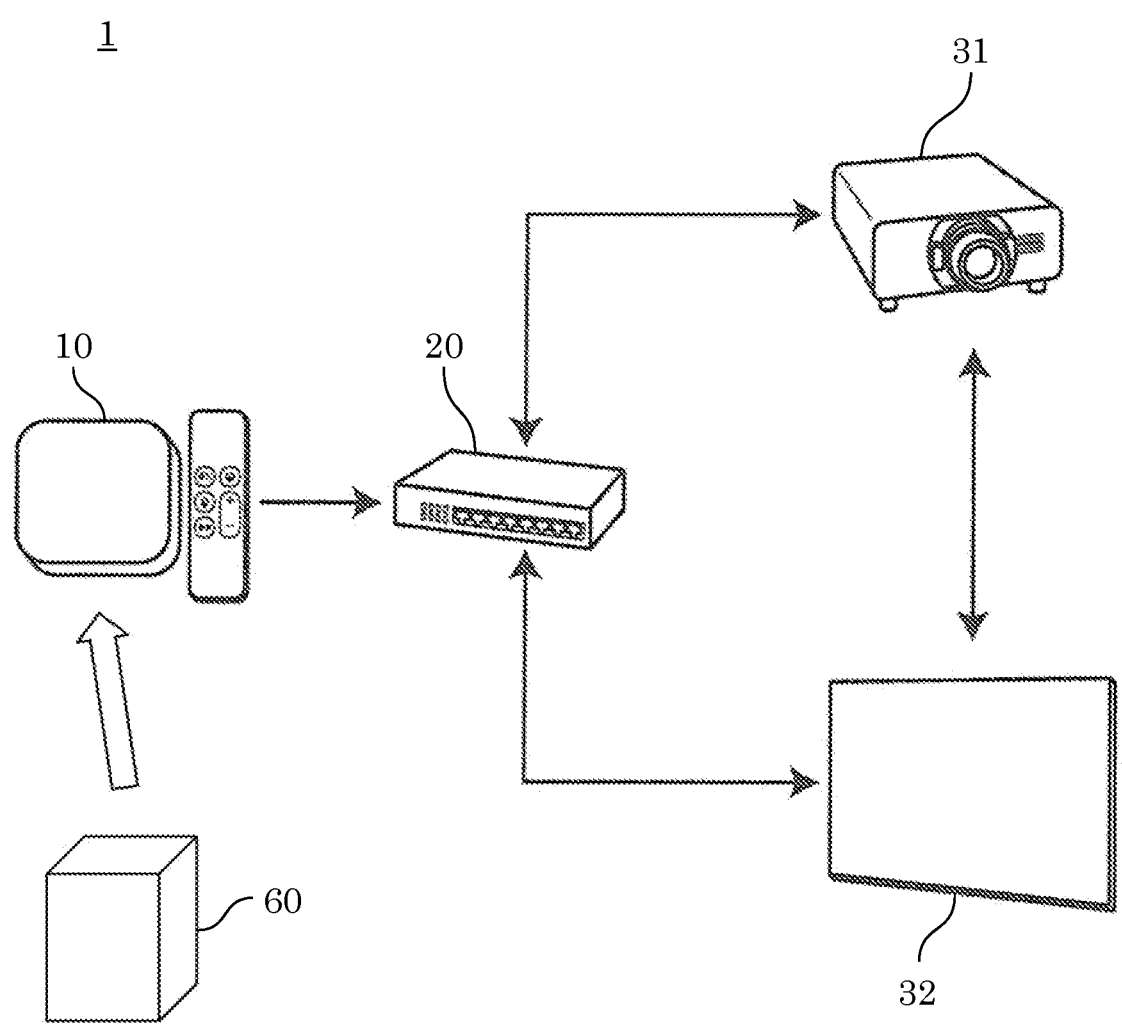
FIG. 1 is a block diagram illustrating a connection relationship example of video display system 1 according to a first exemplary embodiment.

FIG. 1 is a block diagram illustrating an example of a connection relationship in video display system 1 in FIG. 1. With reference to FIG. 1, video display system 1 includes video output device 10, video conversion device 20, first display device 31 that is a projector, and second display device 32 that is a display. Video output device 10 is connected to video conversion device 20 so as to be able to transmit video signals. Video conversion device 20, first display device 31, and second display device 32 are connected so as to be able to transmit and receive various signals to and from each other. Furthermore, video output device 10 can obtain video data for video signals to be transmitted to video conversion device 20 from media server 60 via a network.

Figure 2:
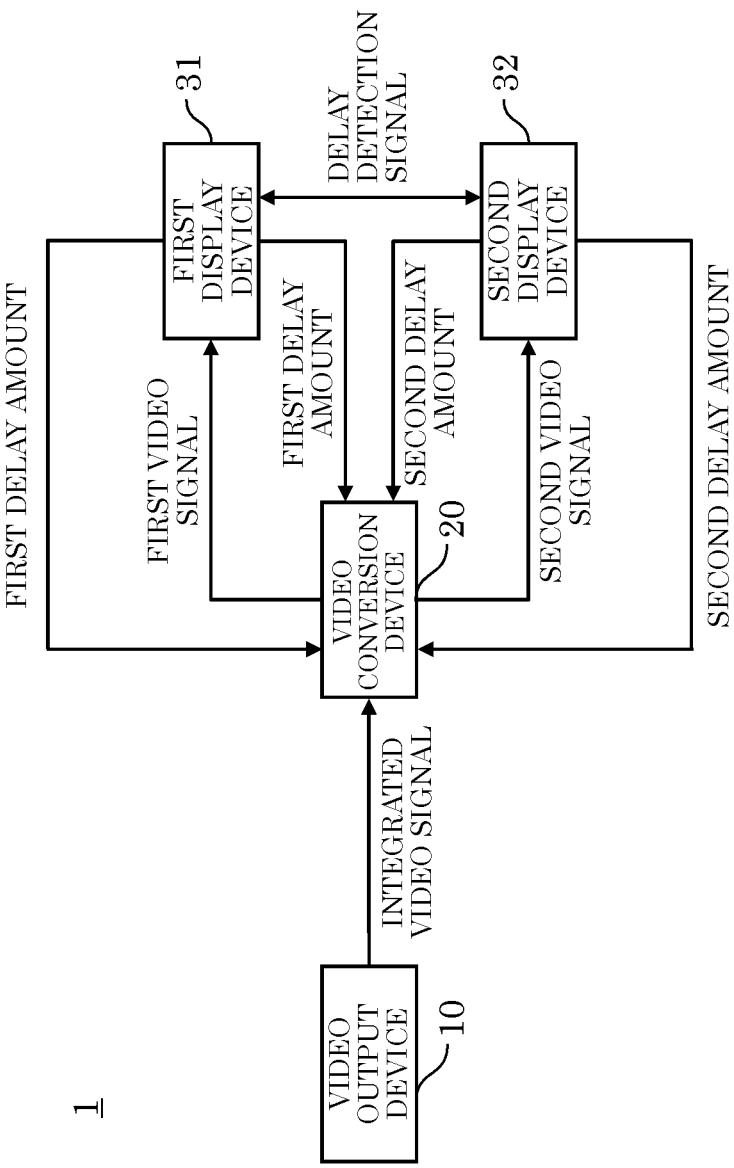
FIG. 2 is a block diagram illustrating a configuration example of video display system 1 in FIG. 1.

FIG. 2 is a block diagram illustrating a configuration example of video display system 1 in FIG. 1. With reference to FIG. 2, video output device 10 outputs an integrated video signal including integrated video content 100 to video conversion device 20. Video conversion device 20 converts integrated video content 100 included in the input integrated video signal into first and second video signals, outputs the first video signal to the first display device, and outputs the second video signal to the second display device. The first and second display devices display videos based on the input first and second video signals, respectively.

Further, first display device 31 transmits and receives delay detection signals to and from second display device 32, thereby detecting the first delay amount indicating how much the timing of the video display is delayed compared to second display device 32 and outputting the signal indicating the first delay amount to video conversion device 20. Similarly, second display device 32 outputs a signal indicating the second delay amount to video conversion device 20. Video conversion device 20 adjusts output timings of the first and second video signals based on the input first and second delay amounts. In this case, the signals indicating the first and second delay amounts each are an example of information related to the display delay time.

Figure 3:
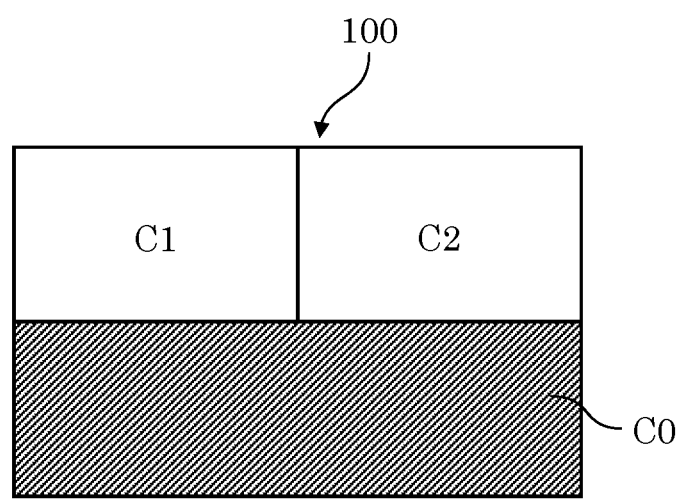
FIG. 3 is a schematic diagram illustrating a configuration example of integrated video content 100 in video display system 1 in FIG. 1.

FIG. 3 is a schematic diagram illustrating a configuration example of integrated video content 100 in video display system 1 in FIG. 1. With reference to FIG. 3, integrated video content 100 includes a region to which partial video content C1 to be displayed on the first display device is allocated, a region to which partial video content C2 to be displayed on the second display device is allocated, and an unused region to which partial video content C0 not to be displayed on any display device is allocated. All the pixels of partial video content C0 may be black.

Figure 4:
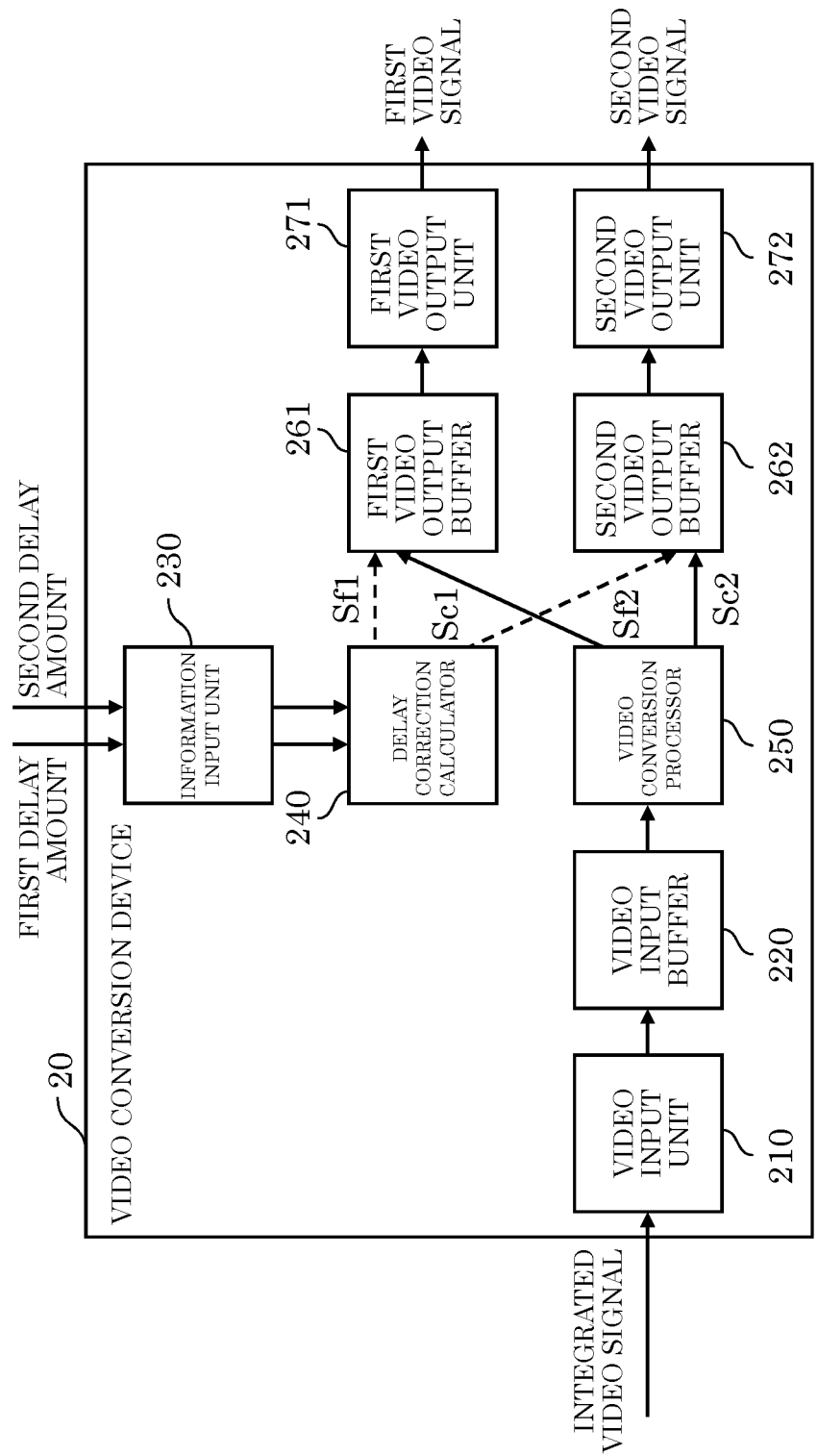
FIG. 4 is a block diagram illustrating a detailed configuration example of video conversion device 20 of video display system 1 in FIG. 1.

FIG. 4 is a block diagram illustrating a detailed configuration example of video conversion device 20 of video display system 1 in FIG. 1. With reference to FIG. 4, video conversion device 20 includes video input unit 210, video input buffer 220, information input unit 230, delay correction calculator 240, video conversion processor 250, first and second video output buffers 261, 262, and first and second video output units 271, 272.

With reference to FIG. 4, video input buffer 220 inputs an integrated video signal via video input unit 210 and temporarily stores the integrated video signal. Delay correction calculator 240 outputs first correction value signal Sf1 to the first video output buffer and outputs second correction value signal Sf2 to the second video output buffer based on the first and second delay amounts input via information input unit 230. First correction value signal Sf1 is a signal indicating the first correction value that is a delay amount for delaying the timing of outputting the first video signal to first display device 31. Likewise, second correction value signal Sf2 is a signal indicating the second correction value that is a delay amount for delaying the timing of outputting the second video signal to second display device 32.

Video conversion processor 250 cuts out a region allocated to partial video content C1 from integrated video content 100 included in the input integrated video signal and outputs first video signal Sc1 to first video output buffer 261. Similarly, video conversion processor 250 outputs second video signal Sc2 indicating partial video content C2 to second video output buffer 262. First video output buffer 261 delays input first video signal Sc1 by the correction value indicated by first correction value signal Sf1 and outputs first video signal Sc1 to first display device 31 via first video output unit 271. Similarly, second video output buffer 262 delays input second video signal Sc2 by the correction value indicated by second correction value signal Sf2 and outputs second video signal Sc2 to second display device 32 via second video output unit 272.

A detailed operation of image display system 1 having the above configuration will be described below.

Video output device 10 outputs an integrated video signal including integrated video content 100 to video conversion device 20. Video conversion processor 250 of the video conversion device receives the integrated video signal via video input unit 210 and video input buffer 220. Video conversion processor 250 cuts out regions respectively corresponding to the first and second display devices from integrated video content 100 included in the input integrated video signal and outputs first and second video signals Sc1 and Sc2 to first and second video output buffers 261 and 262, respectively.

Delay correction calculator 240 inputs the first and second delay amounts from the first and second display devices via information input unit 230. Based on the input first and second delay amounts, delay correction calculator 240 generates first and second correction value signals Sf1 and Sf2 respectively indicating the first and second correction values that delay the output of first and second video signals Sc1 and Sc2 in the first and second video output buffers. Details of the calculation of the correction value will be described below.

In delay correction calculator 240, when the input first delay amount is larger than the second delay amount, the video display timing by the first display device is delayed from the video display timing by the second display device by the difference between the first and second delay amounts. Accordingly, second correction value Sf2 is set to a value larger than first correction value Sf1 by the difference between the first and second delay amounts. As a result, the display timing of the video by the second display device is delayed by the difference between the delay amounts. Conversely, when the second delay amount is larger than the first delay amount, first correction value Sf1 is set to a value larger than second correction value Sf2 by the difference between the first and second delay amounts. Consequently, one display device in which the display timing of a display video is earlier than the display timing of the other display video receives a video signal at a timing later than the other display device. Accordingly, the first and second display devices output videos with the display timing difference being substantially zero.

As described above, the video display system in FIG. 1 detects the delay amount of each display device by transmitting and receiving delay detection signals between first and second display devices 31 and 32. Thereafter, based on the detected delay amounts, video conversion device 20 delays the video signal to be output to one display device having a smaller delay amount than the other display device by the difference in delay amount and outputs the delayed video signal. Consequently, the time difference between the display videos by the respective display devices can be set to substantially zero. In addition, only integrated video content 100 is processed by video conversion device 20, and the videos to be displayed by the plurality of display devices are not simultaneously processed. Therefore, it is not necessary to use a high-performance computer as in the prior art, and it is possible to implement the integrated video content at low cost.

Note that instead of obtaining integrated video content 100 from the network, video output device 10 may include a memory that stores integrated video content 100 and may read integrated video content 100 from the memory.

The first and second delay amounts are detected by transmitting and receiving delay detection signals between the first and second display devices. However, the delay amount of each display device may be a predetermined value measured in advance for each display device. The predetermined first and second delay amounts may be stored in the storage units or the like of the first and second display devices and output to video conversion device 20 or may be stored in the storage unit or the like of delay correction calculator 240 of video conversion device 20. The predetermined first and second delay amounts may be stored in the form of a database of delay correction calculator 240. In this case, video conversion device 20 may acquire identification information such as model names from first and second display devices 31 and 32 and search the database for the first and second delay amounts based on the identification information.

Second Exemplary Embodiment

Figure 5:
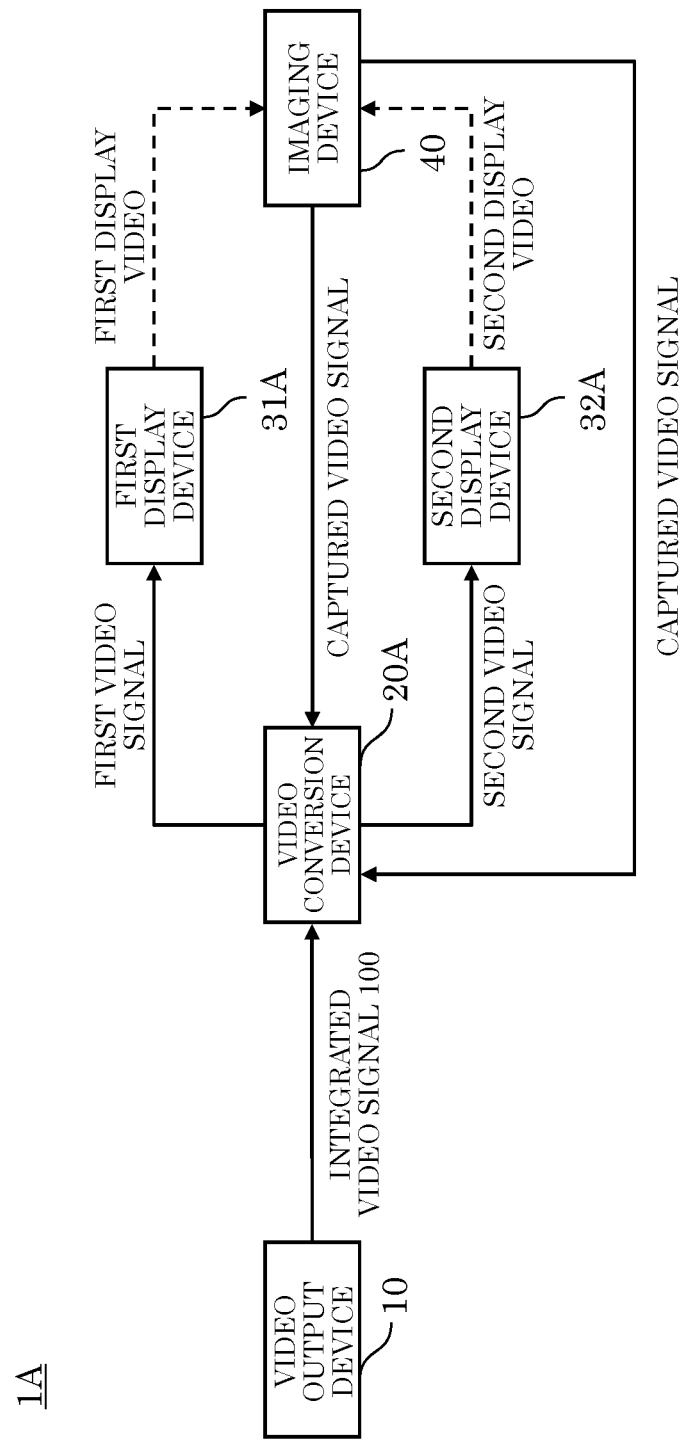
FIG. 5 is a block diagram illustrating a configuration example of video display system 1A according to a second exemplary embodiment.

FIG. 5 is a block diagram illustrating a configuration example of video display system 1A according to a second exemplary embodiment. With reference to FIG. 5, image display system 1A is different from image display system 1 in FIG. 1 in the following points.

(1) Imaging device 40 is further provided.
(2) Video conversion device 20A is provided instead of video conversion device 20.

With reference to FIG. 5, imaging device 40 captures the first video by first display device 31A and the second video by second display device 32A and transmits a captured video signal including the captured videos to video conversion device 20A. Video conversion device 20A calculates the first and second delay amounts based on the captured videos included in the captured video signal. Video conversion device 20A adjusts the output timings of the first and second video signals based on the first and second delay amounts similarly to the first exemplary embodiment. In this case, the captured video signal including the captured videos is an example of information regarding the display delay time.

Figure 6:
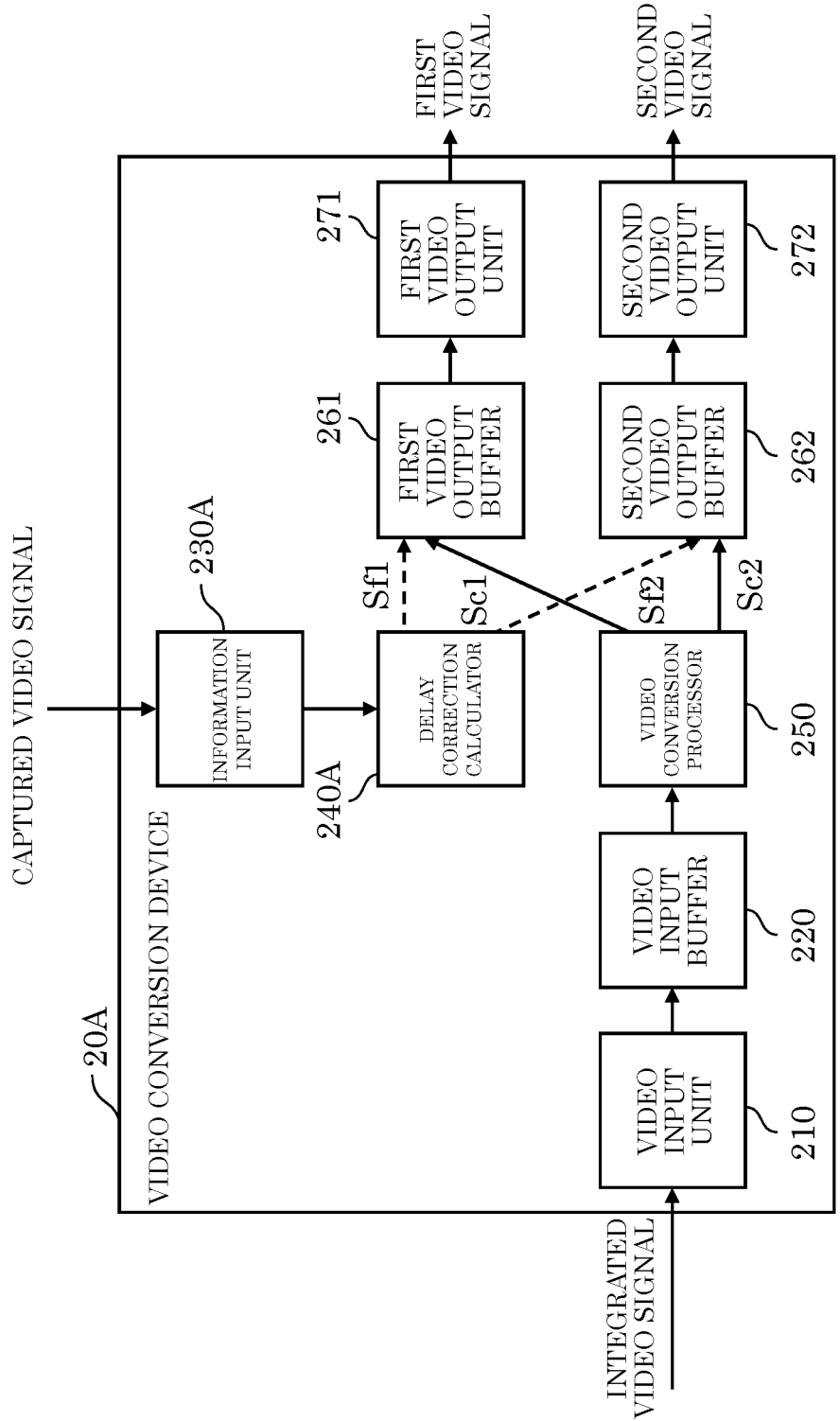
FIG. 6 is a block diagram illustrating a detailed configuration example of video conversion device 20A of video display system 1A in FIG. 5.

FIG. 6 is a block diagram illustrating a detailed configuration example of video conversion device 20A of video display system 1A in FIG. 5. With reference to FIG. 6, video conversion device 20A is different from video conversion device 20 in FIG. 4 in that it includes information input unit 230A and delay correction calculator 240A.

With reference to FIG. 6, delay correction calculator 240A inputs captured video signals from image capturing device 40 via information input unit 230A. Delay correction calculator 240A calculates how much difference is generated between the display timings of the first and second videos from the captured videos included in the input captured video signal. Similarly to the first exemplary embodiment, delay correction calculator 240A delays the video signal output to one display device having a display timing earlier than the display timing of the other display device by the difference between the display timings and outputs the delayed video signal. This substantially eliminates the difference in display timing between the display videos by the first and second display devices.

Third Exemplary Embodiment

Figure 7:
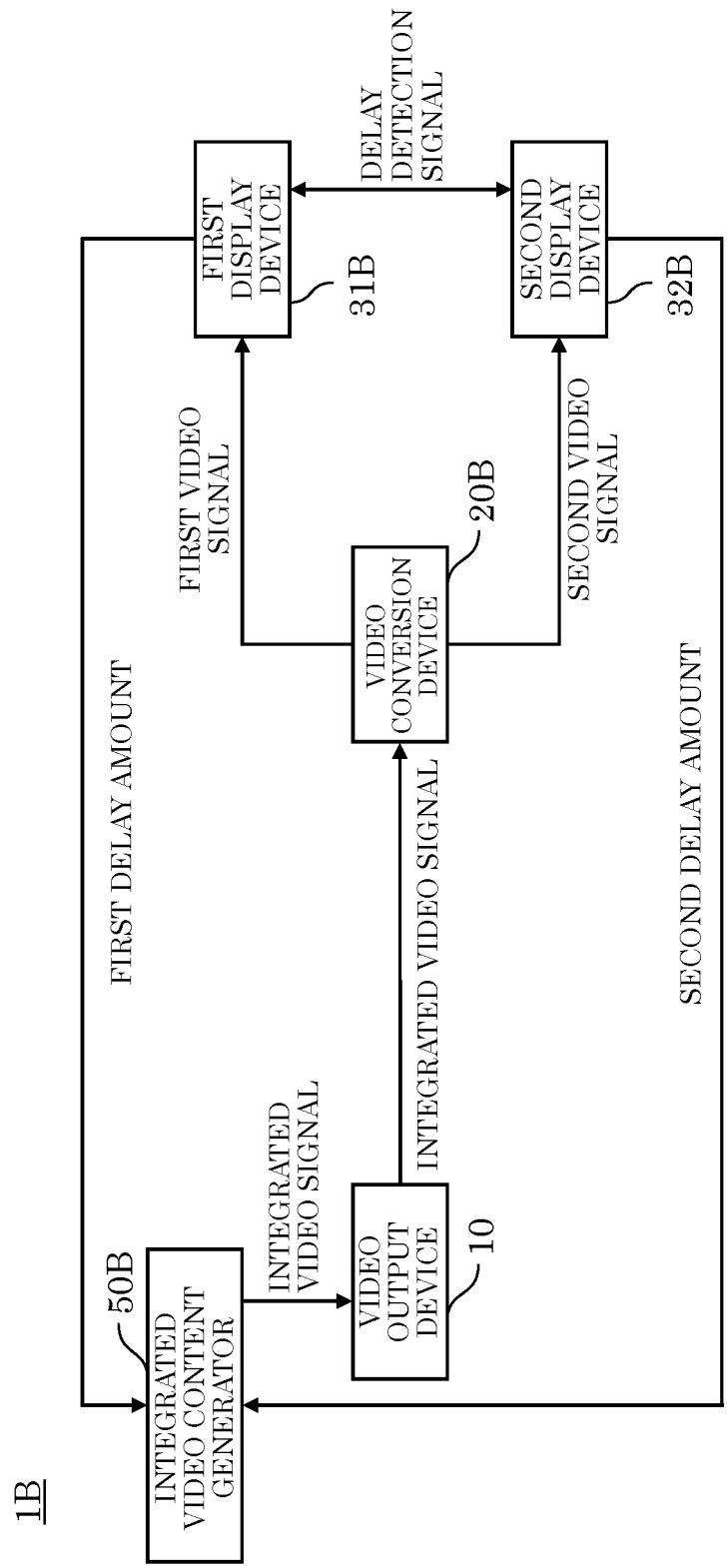
FIG. 7 is a block diagram illustrating a configuration example of video display system 1B according to a third exemplary embodiment.

FIG. 7 is a block diagram illustrating a configuration example of image display system 1B according to a third exemplary embodiment. With reference to FIG. 7, image display system 1B is different from image display system 1 in FIG. 1 in the following points.

(1) Integrated video content generator 50B is further provided.
(2) First and second display devices 31B and 32B output signals indicating the first and second delay amounts to integrated video content generator 50B instead of video conversion device 20.

With reference to FIG. 7, the first and second display devices output the first and second delay amounts to integrated video content generator 50B. Integrated video content generator 50B generates integrated video content 100 including partial video contents C1 and C2 acquired via a network (not illustrated) based on the first and second delay amounts. In this case, when the second delay amount is larger than the input first delay amount, integrated video content generator 50B delays partial video content C1 by the time equal to the difference between the first and second delay amounts. Conversely, when the first delay amount is larger than the input second delay amount, partial video content C2 is delayed by the same time. Further, integrated video content generator 50B integrates two partial video contents C1 and C2 corrected in this way to create integrated video content 100 and outputs the integrated video signal to video output device 10.

Video output device 10 transmits the integrated video signal to video conversion device 20B. Video conversion device 20B cuts out regions corresponding to partial video contents C1 and C2 from integrated video content 100 included in the integrated video signal and transmits the first and second video signals respectively including partial video contents C1 and C2 to the first and second display devices. First and second display devices 31B and 32B display videos based on the transmitted first and second video signals. Further, first and second display devices 31B and 32B respectively output signals indicating the first and second delay amounts to integrated video content generator 50B.

Figure 8:
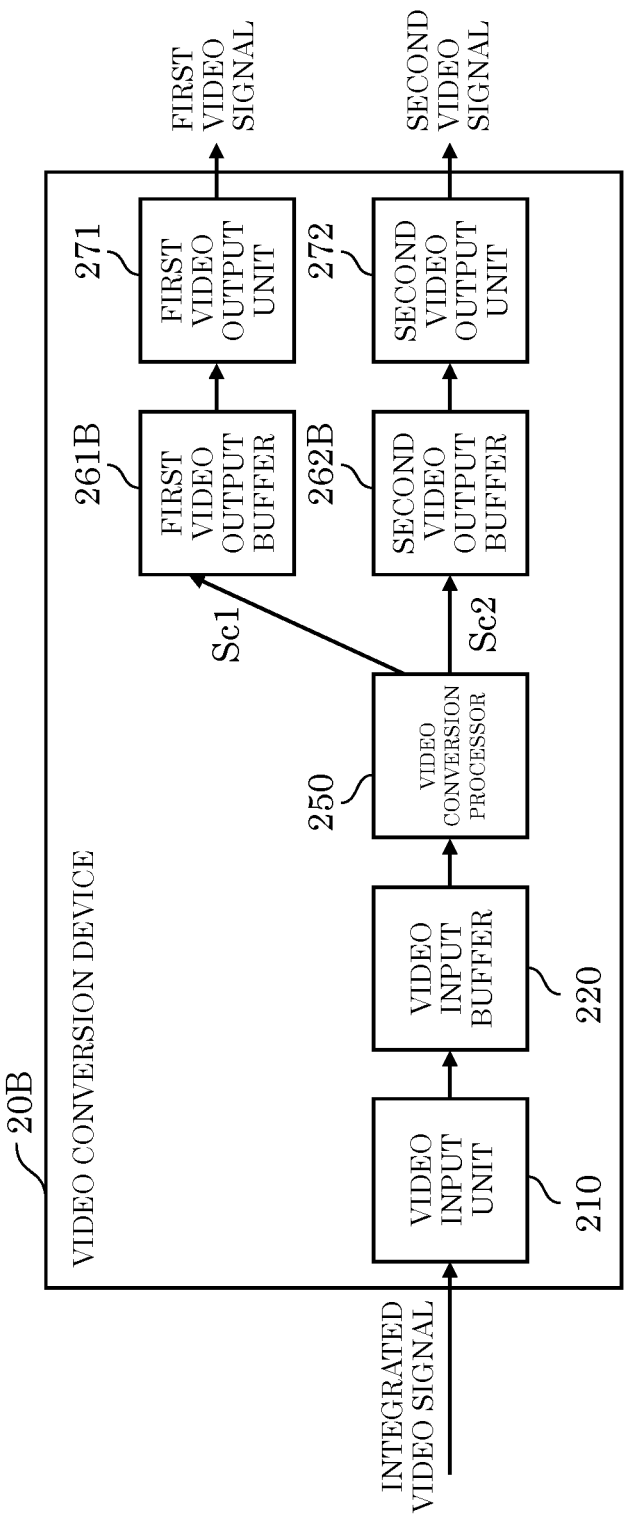
FIG. 8 is a block diagram illustrating a detailed configuration example of video conversion device 20B of video display system 1B in FIG. 7.

FIG. 8 is a block diagram illustrating a detailed configuration example of video conversion device 20B in FIG. 7. With reference to FIG. 8, as compared with video conversion device 20, video conversion device 20B does not include information input unit 230 and delay correction calculator 240 and does not perform delay correction in first and second video output buffers 261B and 262B.

As described above, video display system 1B in FIG. 7 corrects integrated video content 100 generated by integrated video content generator 50B based on the difference between the first and second delay amounts between the first and second display devices and substantially eliminates the difference between the display timings of the display videos of the first and second display devices. In the present exemplary embodiment, integrated video content generator 50B acquires the first and second delay amounts from first and second display devices 31B and 32B, but may use the values stored in advance in integrated video content generator 50B as the first and second delay amounts.

Fourth Exemplary Embodiment

Figure 9:
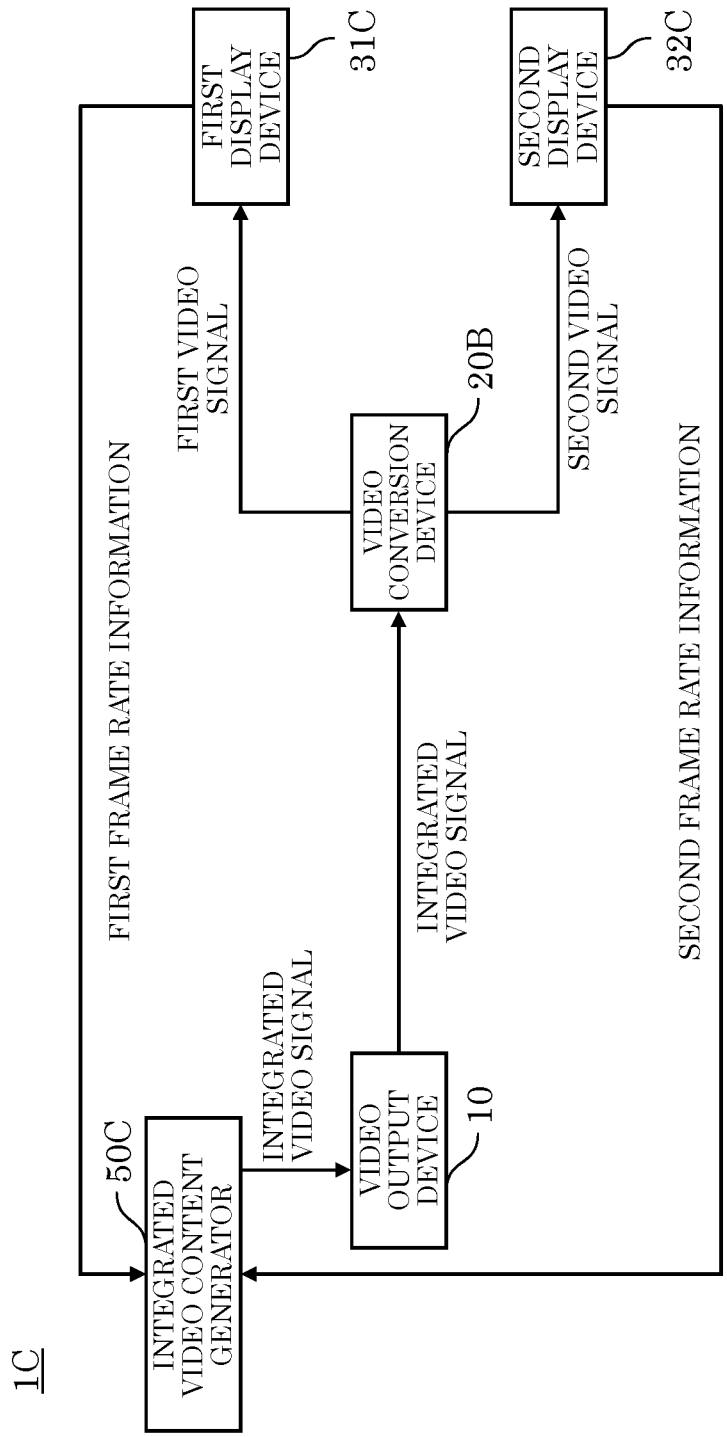
FIG. 9 is a block diagram illustrating a configuration example of video display system 1C according to a fourth exemplary embodiment.

FIG. 9 is a block diagram illustrating a configuration example of image display system 1C according to a fourth exemplary embodiment. With reference to FIG. 9, video display system 1C is different from video display system 1B in FIG. 7 in that first display device 31C outputs first frame rate information and second display device 32C outputs the second frame rate information to integrated video content generator 50C.

With reference to FIG. 9, first display device 31C transmits the display frame rate of first display device 31C, for example, 30 frames per second, to integrated video content generator 50C as first frame rate information. Likewise, second display device 32C transmits the display frame rate of second display device 32C, for example, 60 frames per second, to integrated video content generator 50C as second frame rate information. On the basis of the first frame rate information and the second frame rate information from first and second display devices 31C and 32C, integrated video content generator 50C generates integrated video content 100 that makes first and second display devices 31C and 32C have the same display frame rate.

Consider, for example, a case in which the display frame rate of first display device 31C is 30 frames per second and the display frame rate of second display device 32C is 60 frames per second. In this case, integrated video content generator 50C converts partial video content C2 into partial video content C2 in which the same video as the previous frame is displayed in the even-numbered frame. As a result, the video displayed by second display device 32C becomes a video that is updated to a new image every two frames, and hence the frame rate is substantially 30 frames per second. Therefore, the frame rates of the display videos match between the first and second display devices, and a sense of discomfort between the respective display videos is reduced. In the present exemplary embodiment, integrated video content generator 50C acquires first frame rate information and second frame rate information from first and second display devices 31C and 32C, but may use the values stored in advance in integrated video content generator 50C as the first frame rate information and the second frame rate information.

Fifth Exemplary Embodiment

Figure 10:
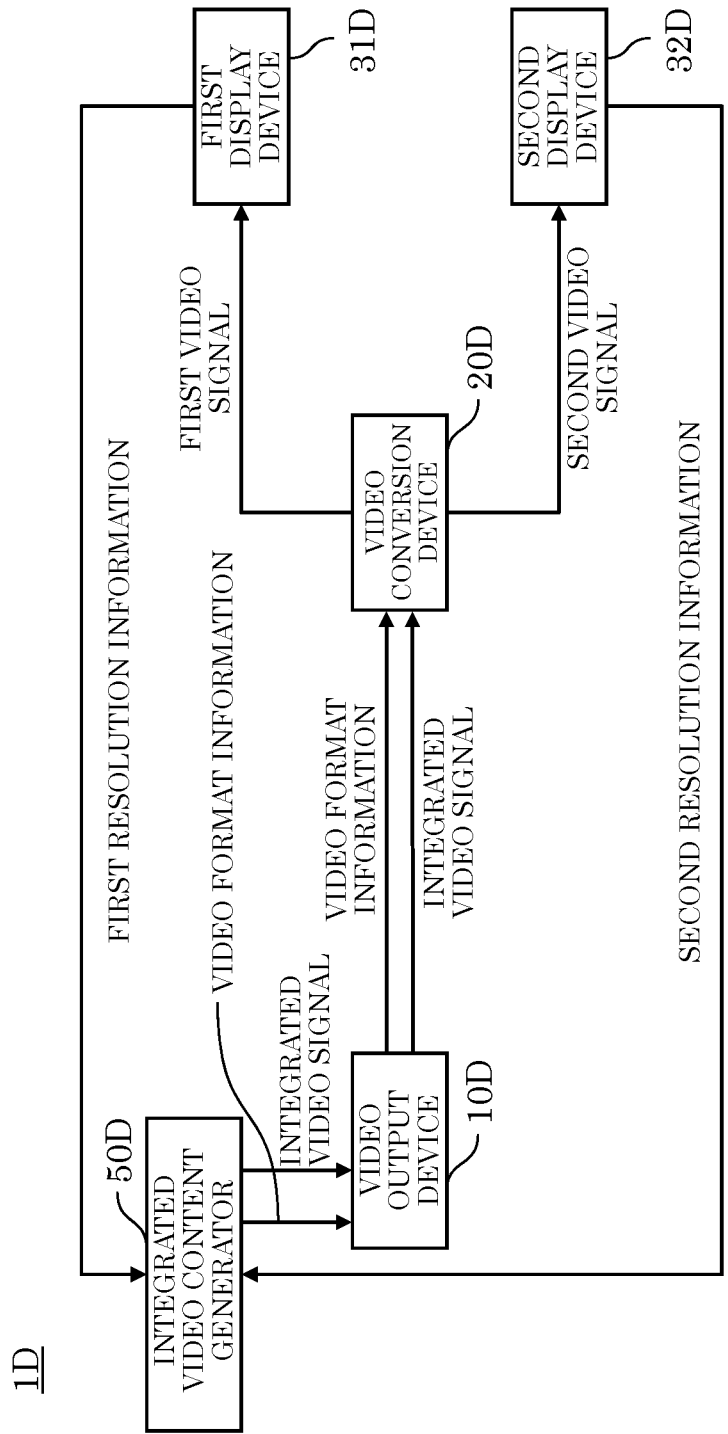
FIG. 10 is a block diagram illustrating a configuration example of video display system 1D according to a fifth exemplary embodiment.

FIG. 10 is a block diagram illustrating a configuration example of image display system 1D according to a fifth exemplary embodiment. With reference to FIG. 10, image display system 1D is different from image display system 1B in FIG. 7 in the following points.

(1) First and second display devices 31D and 32D respectively output the first resolution information and the second resolution information to integrated video content generator 50D.
(2) Integrated video content generator 50D further transmits video format information to video conversion device 20D via video output device 10D.

With reference to FIG. 10, first display device 31D transmits first resolution information indicating the resolution of a display video by first display device 31D to integrated video content generator 50D. Similarly, second display device 32D transmits the second resolution information. On the basis of the first resolution information and the second resolution information, integrated video content generator 50D converts partial video contents C1 and C2 into integrated video content 100 such that the ratio of the resolutions of first and second partial video contents C1 and C2 becomes equal to the ratio of the display resolutions of first and second display devices 31D and 32D. Integrated video content generator 50D further transmits video format information indicating which region in integrated video content 100 corresponds to which partial video content to video conversion device 20D via video output device 10D. Video conversion device 20D cuts out partial video contents C1 and C2 from integrated video content 100 based on the video format information and transmits the first and second video signals respectively including partial video contents C1 and C2 to the first and second display devices 31D and 32D.

Figure 11:
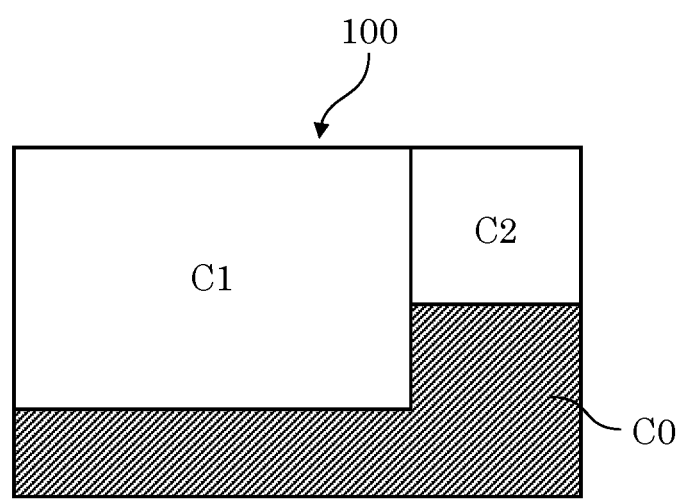
FIG. 11 is a schematic diagram illustrating a configuration example of integrated video content 100 in video display system 1D in FIG. 10.

FIG. 11 is a schematic diagram illustrating a configuration example of integrated video content 100 in video display system 1D in FIG. 10. Integrated video content 100 in FIG. 11 illustrates an example in which the resolution of first display device 31D is 4K and the resolution of second display device 32D is 2K. In this case, first display device 31D transmits the first resolution information indicating that the resolution is 4K to integrated video content generator 50D. Likewise, second display device 32D transmits the second resolution information indicating that the resolution is 2K to integrated video content generator 50D. On the basis of the first resolution information and the second resolution information, integrated video content generator 50D performs conversion such that the ratio of the horizontal widths of partial video contents C1 and C2 in integrated video content 100 becomes 2:1 and generates integrated video content 100.

Figure 12:
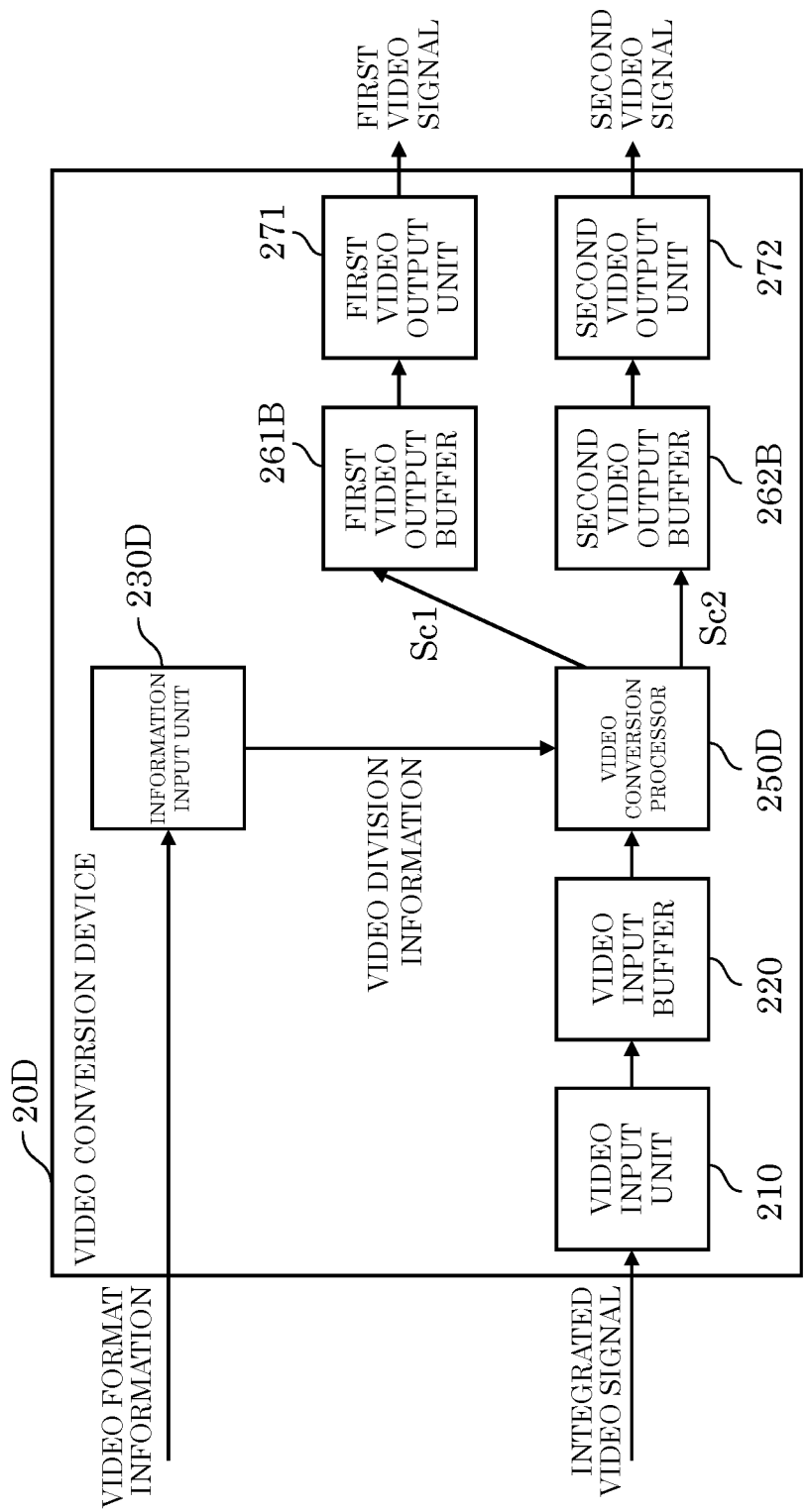
FIG. 12 is a block diagram illustrating a detailed configuration example of video conversion device 20D of video display system 1D in FIG. 10.

FIG. 12 is a block diagram illustrating a detailed configuration example of video conversion device 20D of video display system 1D in FIG. 10. With reference to FIG. 12, video conversion device 20D is different from video conversion device 20B in FIG. 8 in that video conversion processor 250D further inputs video format information via information input unit 230D. Based on the input video format information, video conversion processor 250D cuts out partial video contents to be displayed on the first and second display devices from integrated video content 100 included in the input integrated video signal and outputs first and second video signals Sc1 and Sc2.

As described above, based on the resolution information indicating the resolutions of the display videos by first and second display devices 31D and 32D, video display system 1D in FIG. 10 enlarges and reduces partial video contents C1 and C2 such that the ratio of the resolutions of partial video contents C1 and C2 in integrated video content 100 becomes equal to the ratio of the resolutions of the display videos by first and second display devices 31D and 32D, thereby generating integrated video content 100. Consequently, when the first and second videos are displayed by the first and second display devices, the resolutions of the two videos coincide with each other, and the sense of discomfort between the display videos is reduced. Note that integrated video content 100 may be generated based on the ratio of the display pixel sizes of the first and second display devices such that the displayed videos have the same fineness. Further, based on the information of an overscan in which a part of the video is not displayed protruding from the displayable region of the display device, integrated video content 100 may be generated such that the protruding portion is displayed by another display device or is not included in integrated video content 100. In the present exemplary embodiment, integrated video content generator 50D acquires the first resolution information and second resolution information from first and second display devices 31D and 32D, but may use the values stored in advance in integrated video content generator 50D as the first resolution information and second resolution information.

Sixth Exemplary Embodiment

Figure 13:
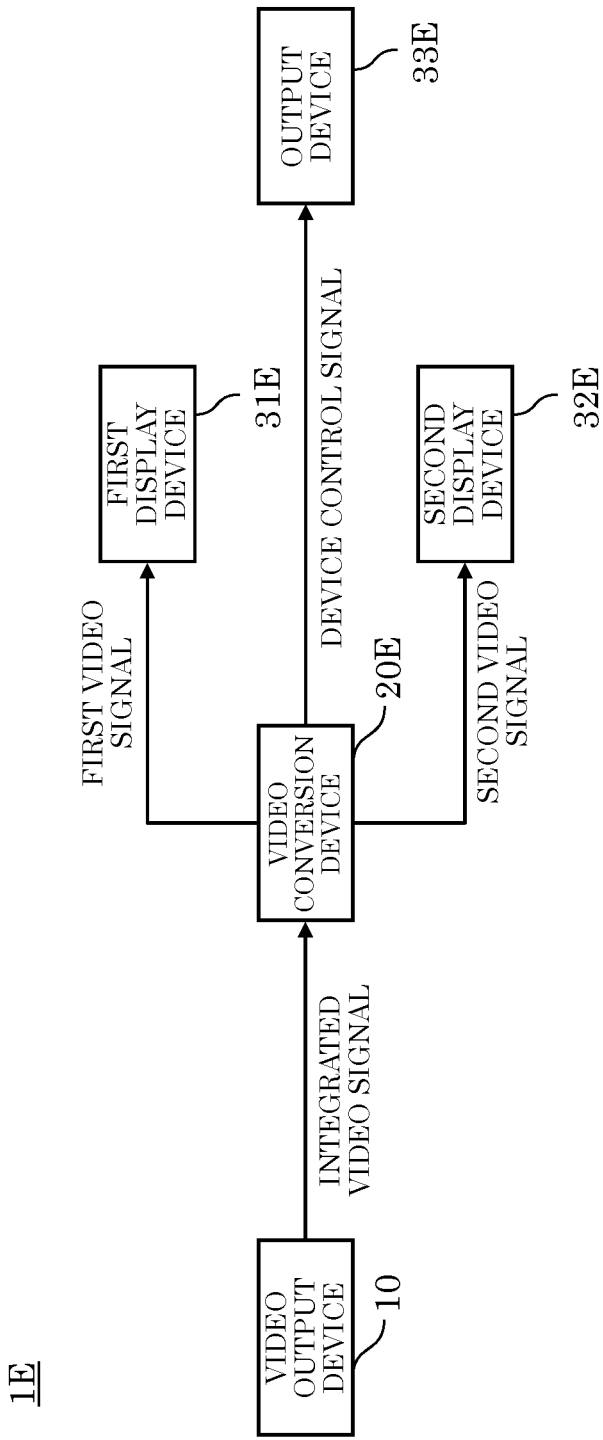
FIG. 13 is a block diagram illustrating a configuration example of video display system 1E according to a sixth exemplary embodiment.

FIG. 13 is a block diagram illustrating a configuration example of image display system 1E according to a sixth exemplary embodiment. With reference to FIG. 13, image display system 1E further includes output device 33E as compared with image display system 1 in FIG. 2. Output device 33E is, for example, an output device such as a temperature regulation device capable of regulating the temperature at each point of the rectangular region or a blower capable of sending wind at an arbitrary wind speed from each point of the rectangular region.

Figure 14:
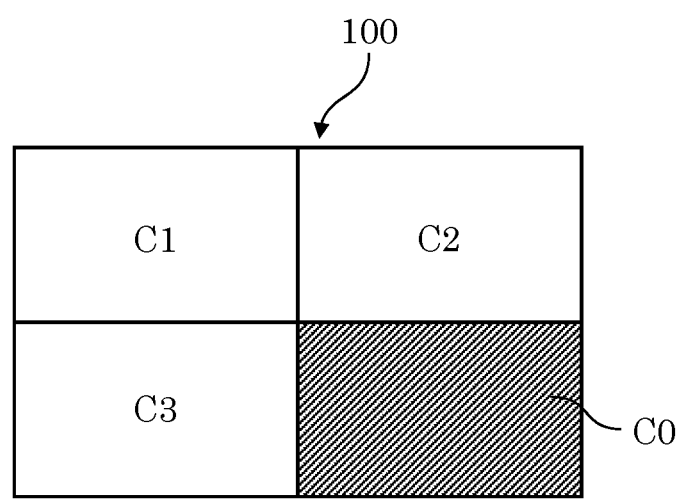
FIG. 14 is a schematic diagram illustrating a configuration example of integrated video content 100 in video display system 1E in FIG. 13.

FIG. 14 is a schematic diagram illustrating a configuration example of integrated video content 100 in video display system 1E in FIG. 13. Integrated video content 100 includes partial video content C3 corresponding to output device 33E in addition to partial video content C1 and C2 corresponding to first and second display devices 31E and 32E. With reference to FIG. 14, partial video content C3 includes a video signal for controlling output device 33E instead of indicating a video to be displayed by some display device.

Figure 15:
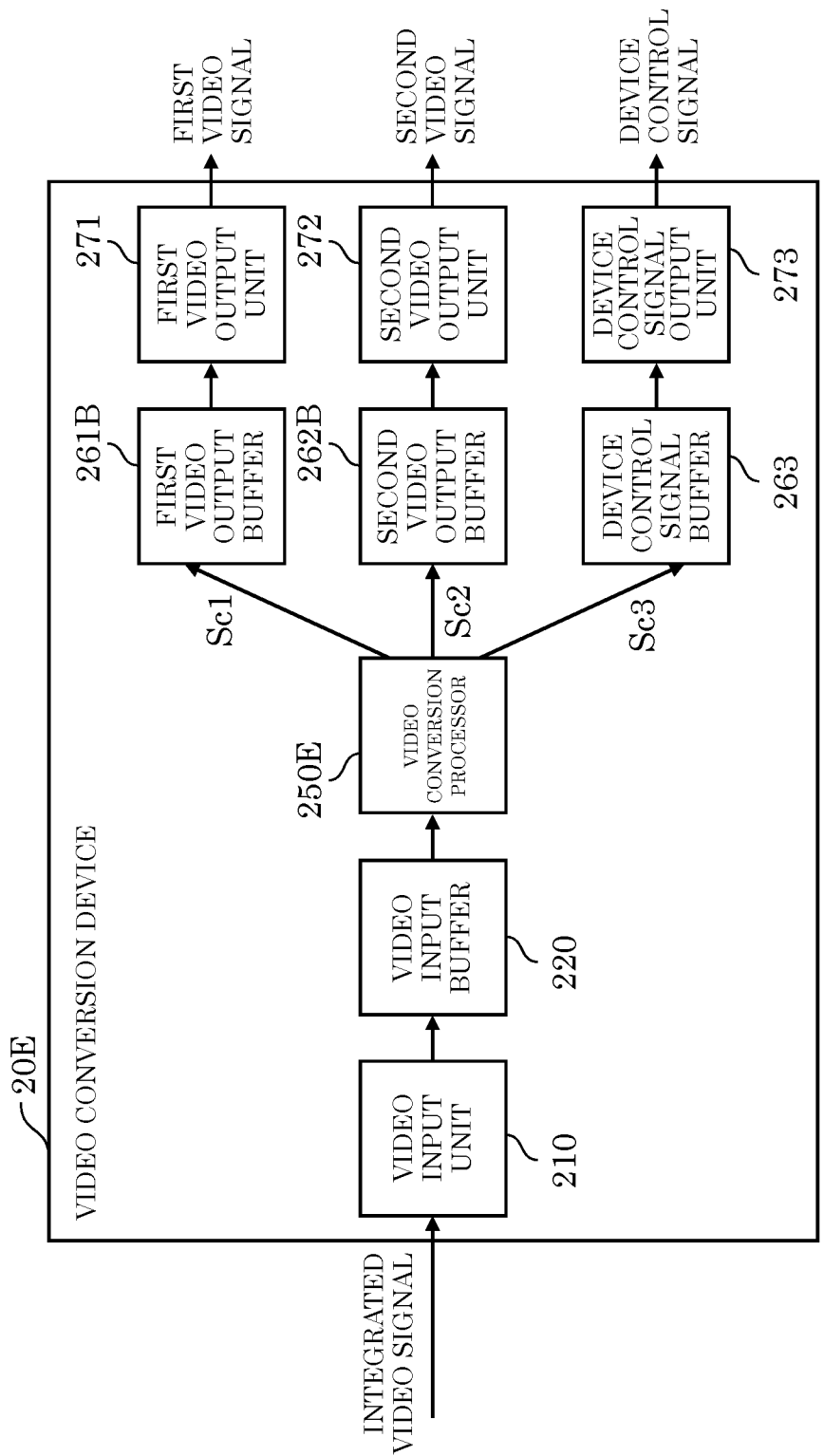
FIG. 15 is a block diagram illustrating a detailed configuration example of video conversion device 20E of video display system 1E in FIG. 13.

FIG. 15 is a block diagram illustrating a detailed configuration example of video conversion device 20E in FIG. 13. With reference to FIG. 15, video conversion device 20E further includes device control signal buffer 263 and device control signal output unit 273 as compared with video conversion device 20B in FIG. 8. Video conversion processor 250E cuts out partial video contents C1, C2, and C3 respectively corresponding to first display device 31E, second display device 32E, and output device 33E from integrated video content 100. Subsequently, first video signal Sc1 including partial video content C1 is output to first display device 31E via first video output buffer 261B and first video output unit 271, second video signal Sc2 including partial video content C2 is output to second display device 32E via second video output buffer 262B and second video output unit 272, and device control signal Sc3 including partial video content C3 is output to output device 33E via device control signal buffer 263 and device control signal output unit 273. The relationship between partial video content C3 and the operation of output device 33E will be described below.

Figure 16A:
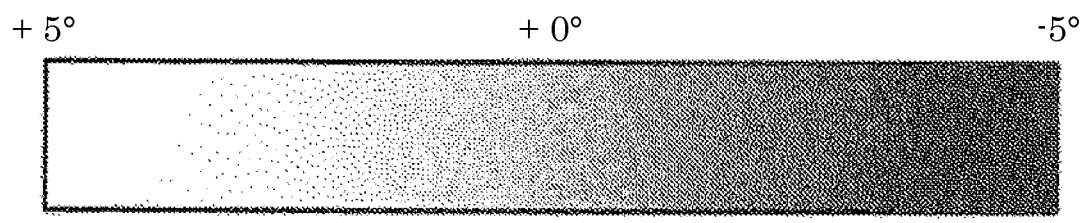
FIG. 16A is a schematic diagram illustrating a relationship between luminance and temperature of pixels in integrated video content 100 in FIG. 14.

FIG. 16A is a schematic diagram illustrating an example of the correspondence relationship between luminance of each pixel and temperature in partial video content C3 in FIG. 14. FIG. 16A is a diagram having the gradation of luminance such that the left end is white and the right end is black, in which a white pixel indicates a temperature 5 degrees higher than a predetermined reference value, with the temperature decreasing as approaching black, and a black pixel indicates a temperature 5 degrees lower than the predetermined reference value.

Figure 16B:
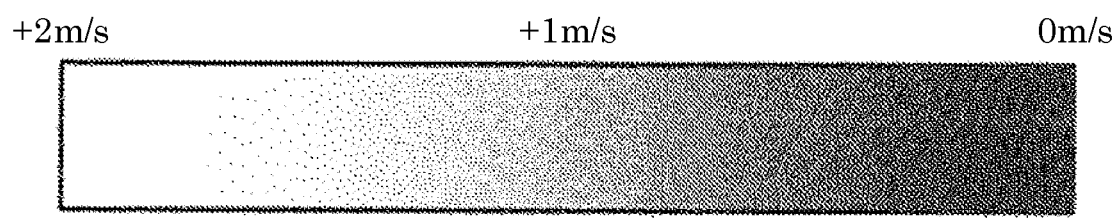
FIG. 16B is a schematic diagram illustrating a relationship between luminance and wind speed of pixels in integrated video content 100 in FIG. 14.

FIG. 16B is a schematic diagram illustrating an example of the correspondence relationship between luminance of each pixel and wind speed in partial video content C3 in FIG. 14. Partial video content C3 in FIG. 16B has the similar gradation as in FIG. 16A, with white indicating that wind is generated at 2 meters per second, and black indicating that wind is not generated.

Figure 17A:
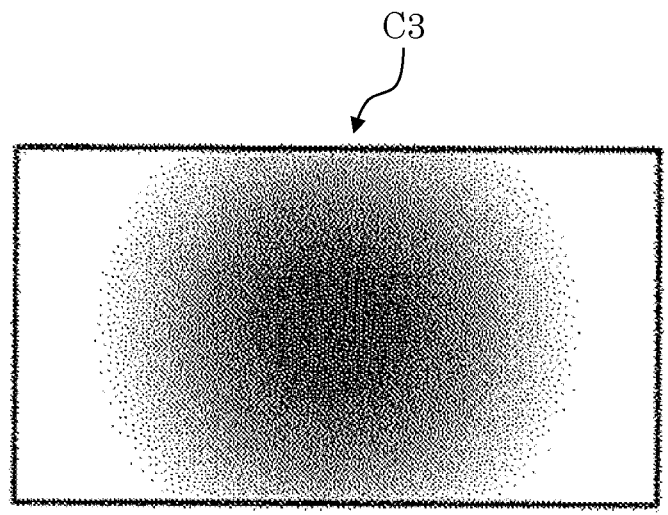
FIG. 17A is a schematic diagram illustrating an example of partial video content C3 for device control in integrated video content 100 in FIG. 14.

FIG. 17A is a schematic diagram illustrating an example of partial video content C3 in FIG. 14. FIG. 17A is a diagram having the gradation of luminance such that the center is black and the four corners are white. The luminance of each pixel corresponds to a temperature in the correspondence relationship of FIG. 16A, and output device 33E, which is a temperature regulation device, is controlled by a device control signal including partial video content C3 to perform temperature regulation such that the temperature at the four corner ends is higher by 5 degrees than the rest, becomes lower toward the center from the four corner ends, and becomes lower by 5 degrees at the center.

Figure 17B:
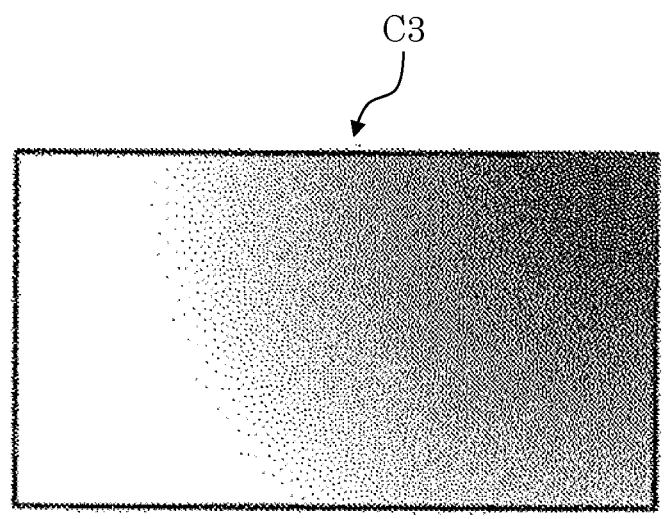
FIG. 17B is a schematic diagram illustrating another example of partial video content C3 for device control in integrated video content 100 in FIG. 14.

FIG. 17B is a schematic diagram illustrating another example of partial video content C3 in FIG. 14. FIG. 17B is a diagram having the gradation of luminance such that an upper right end is black and a lower left end is white. The luminance of each pixel corresponds to a wind speed in the correspondence relationship of FIG. 16B, and output device 33E, which is a blower, is controlled by the device control signal including partial video content C3 to regulate the strength of blowing such that the wind sent from the lower left end has a wind speed of 2 meters per second, decreases with an increase in distance from the lower left end, and becomes still at the upper right end.

As described above, video display system 1E includes output device 33E. Video conversion device 20E cuts out partial video contents C1, C2, and C3 from integrated video content 100 and outputs video signals and a device control signal to the corresponding display devices and output device, respectively. The display device displays a video based on the transmitted video signal, and the output device is controlled by a transmitted device control signal. Consequently, various devices other than the display device can simultaneously be controlled by integrated video content 100. Note that the output device controlled by the device control signal may be a speaker that outputs sound, an illumination device capable of adjusting brightness and color, a device capable of outputting smell, or the like.

Other Exemplary Embodiments

The first to sixth exemplary embodiments each have been described above as an example of the technique disclosed in the present disclosure. However, the technique of the present disclosure is not limited to these exemplary embodiments, and also applicable to other exemplary embodiments that undergo modifications, replacements, additions, and omissions, for example, as appropriate. A new exemplary embodiment can also be made by combining the respective components described in the exemplary embodiments above. Accordingly, other exemplary embodiments will be exemplarily described below.

FIGS. 18A to 18K are schematic diagrams illustrating examples of integrated video content 100 according to Modification 1 to 11. An effect in a case in which integrated video content 100 in FIGS. 18A to 18K is used will be briefly described below. In common with FIGS. 18A to 18K, partial video content Ci (where i is an integer of 1 or more) of integrated video content 100 indicates a partial video content of integrated video content 100 which is displayed by the i-th display device. Further, partial video content C0 indicates an unused region to which no video content is allocated, and frame Ci(j) indicates the j-th frame of partial video content Ci. However, in the drawings, the reference numeral of integrated video content 100 is omitted for simplicity. One or more of the plurality of display devices may be the output device described in the sixth exemplary embodiment.

Figure 18A:
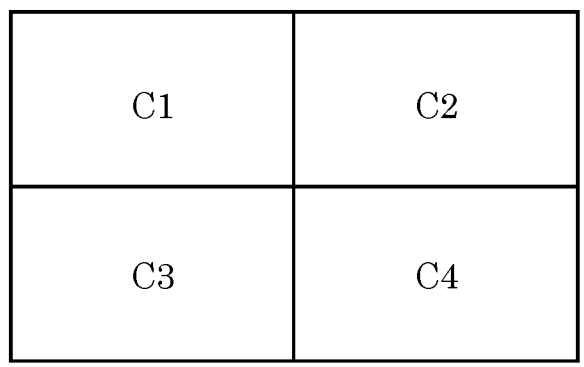
FIG. 18A is a schematic diagram illustrating a configuration example of integrated video content 100 according to Modification 1.

With reference to FIG. 18A, integrated video content 100 includes partial video contents C1 to C4. By using such integrated video content 100, three or more display devices or output devices can be simultaneously controlled.

Figure 18B:
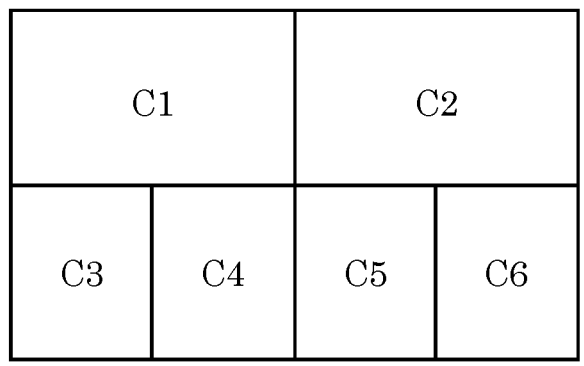
FIG. 18B is a schematic diagram illustrating a configuration example of integrated video content 100 according to Modification 2.

With reference to FIG. 18B, integrated video content 100 includes partial video contents C1 and C2 and partial video contents C3 to C6 smaller than partial video contents C1 and C2. By using such integrated video content 100, it is possible to simultaneously control a plurality of video display devices having different shapes or resolutions of videos to be displayed.

Figure 18C:
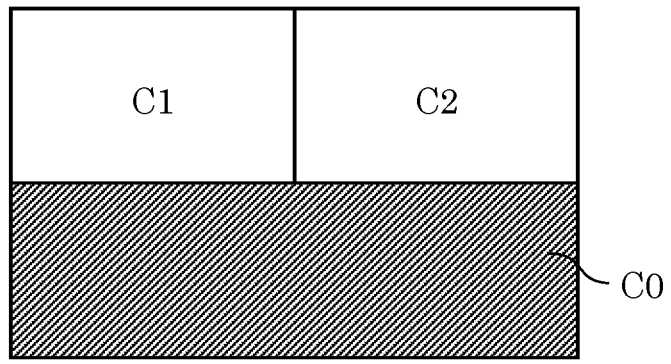
FIG. 18C is a schematic diagram illustrating a configuration example of integrated video content 100 according to Modification 3.

With reference to FIG. 18C, integrated video content 100 includes partial video content C0. Partial video content C0 allocated to an unused area is assumed to be all black pixels. Consequently, the size of the data of integrated video content 100 can be suppressed.

Figure 18D:
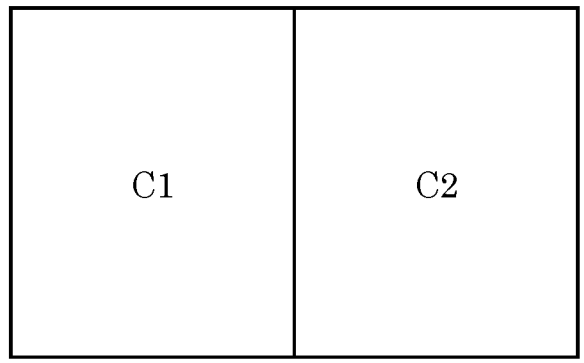
FIG. 18D is a schematic diagram illustrating a configuration example of integrated video content 100 according to Modification 4.

With reference to FIG. 18D, integrated video content 100 includes partial video contents C1 and C2 rotated by 90° from the actual display video. In this way, by using the entire region of integrated video content 100, transmission of unnecessary data including the unused region can be suppressed, and transmittable data can be increased.

Figure 18E:
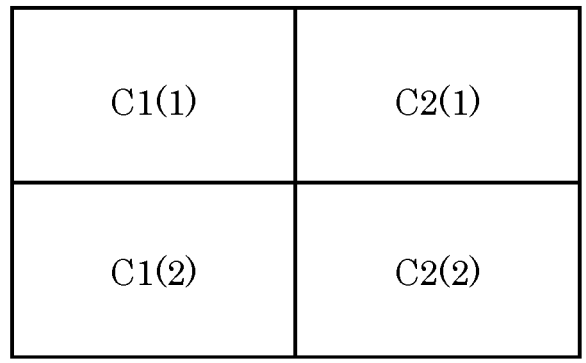
FIG. 18E is a schematic diagram illustrating a configuration example of integrated video content 100 according to Modification 5.

FIG. 18E illustrates the first frame of integrated video content 100, and integrated video content 100 in FIG. 18E includes first and second frames (C1 (1) and C1 (2)) of partial video content C1 and first and second frames (C2 (1) and C2 (2)) of partial video content C2. In this way, by including the plurality of frames of the display device in integrated video content 100, it is possible to display a video having a higher frame rate than that of integrated video content 100.

Figure 18F:
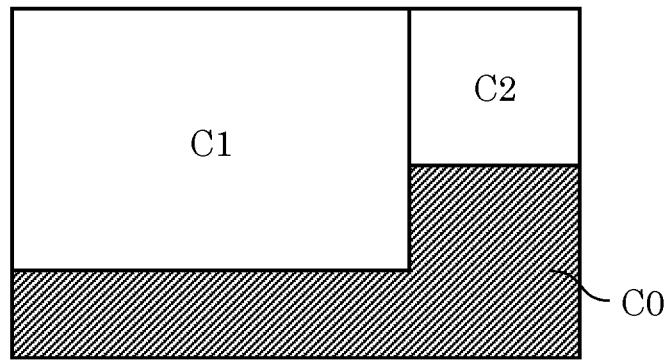
FIG. 18F is a schematic diagram illustrating a configuration example of integrated video content 100 according to Modification 6.

In integrated video content 100 in FIG. 18F, as described in the fifth exemplary embodiment, the ratio between partial video contents C1 and C2 is equal to the ratio of the display resolutions. Consequently, the display resolutions of the display videos coincide with each other, and the sense of discomfort between the two display videos is reduced.

Figure 18G:
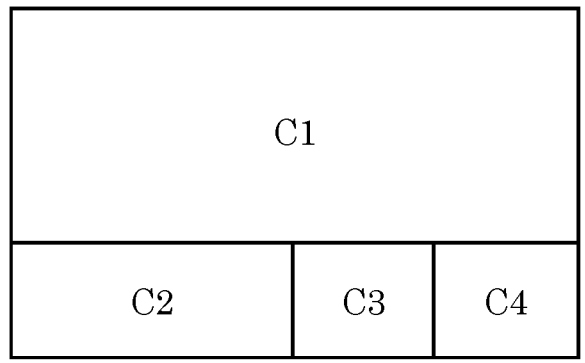
FIG. 18G is a schematic diagram illustrating a configuration example of integrated video content 100 according to Modification 7.

With reference to FIG. 18G, integrated video content 100 includes partial video contents C1 to C4. Partial video content C1 occupies the entire width of integrated video content 100 and is arranged so as to maximize the resolution. This increases the resolution of the video displayed by the first display device. As described above, regarding the arrangement of the partial video content in integrated video content 100, it is possible to freely arrange a partial video content such as transmitting a partial video content with high resolution to a display device in which a display video with high resolution is required.

Figure 18H:
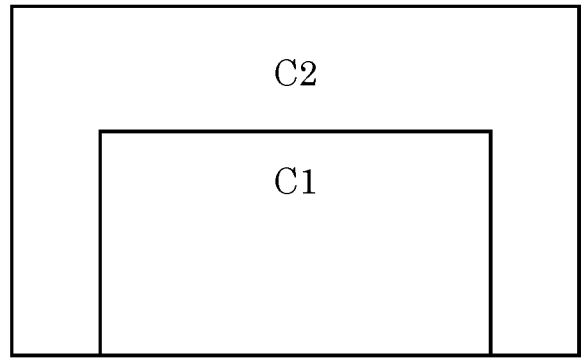
FIG. 18H is a schematic diagram illustrating a configuration example of integrated video content 100 according to Modification 8.

With reference to FIG. 18H, integrated video content 100 includes rectangular partial video content C1 and partial video content C2 arranged in a concave shape at an outer edge of partial video content C1. This is integrated video content 100 of an example in which a video is simultaneously displayed on the first display device that is a panel display and the second display device behind the first display device and larger than the first display device. As described above, the partial video content is not limited to a rectangle and can take any shape according to the combination of display devices.

Figure 18I:
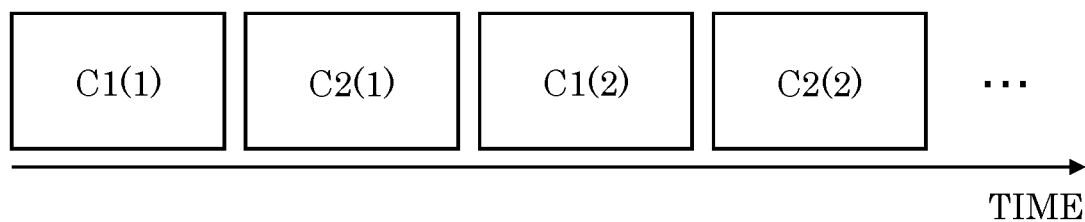
FIG. 18I is a schematic diagram illustrating a configuration example of integrated video content 100 according to Modification 9.

With reference to FIG. 18I, the abscissa indicates time, the leftmost frame indicates the first frame of integrated video content 100, and integrated video content 100 is indicated frame by frame in order. In this way, in integrated video content 100, the first and second partial video contents are distributed in the time direction so as to appear alternately. As a result, the frame rate of the display video of each display device is half that of integrated video content 100, but the partial video content with high resolution can be included in integrated video content 100.

Figure 18J:
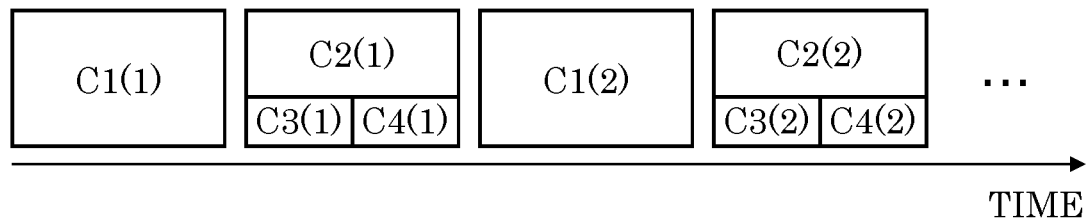
FIG. 18J is a schematic diagram illustrating a configuration example of integrated video content 100 according to Modification 10.

With reference to FIG. 18J, three partial video contents C2 to C4 are included in each even-numbered frame among the alternately appearing frames in FIG. 18I. In this manner, the region division as in the example of FIG. 18B and the distribution in the time direction as in the example of FIG. 18I can be combined.

Figure 18K:
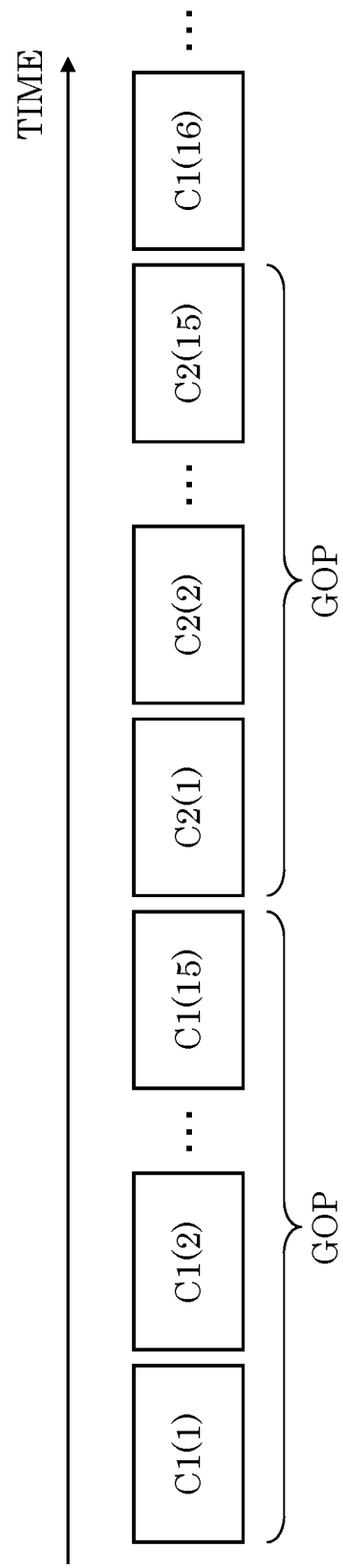
FIG. 18K is a schematic diagram illustrating a configuration example of integrated video content 100 according to Modification 11.

With reference to FIG. 18K, integrated video content 100 is a file compressed by the MPEG method, and the two partial video contents appear alternately every GOP (Group of Pictures: a unit of group of frames in the MPEG compression method) instead of appearing alternately every frame as in FIG. 18I. This improves the compression ratio and image quality of integrated video content 100.

As described above, the exemplary embodiments have been described as examples of the technique of the present disclosure. In addition, for this purpose, the accompanying drawings and the detailed description have been provided.

Therefore, in order to illustrate the above techniques, the components described in the accompanying drawings and the detailed description can include not only components necessary to solve the problem but also components not necessary to solve the problem. Therefore, it should not be immediately construed that these components that are not essential are essential just because these components that are not essential are described in the accompanying drawings and the detailed description.

Since the above-described exemplary embodiments are intended to exemplify the technique according to the present disclosure, various modifications, replacements, additions, and omissions can be made within the scope of the appended claims or of their equivalents.

The present disclosure can be applied to a video display system including a plurality of video display devices having different display delay times.

What is claimed is:

1. A video display system comprising:
   a plurality of display devices having mutually different display delay times; and
   a video conversion device that divides an input integrated video signal into a plurality of video signals and respectively outputs the plurality of video signals to the plurality of display devices,
   wherein at least one of the plurality of video signals is output in a delayed state with respect to the other of the plurality of video signals to make a difference between display timings of the plurality of videos respectively displayed on the plurality of display devices substantially zero, based on the display delay times,
   the plurality of display devices includes an output device controlled by a third video signal,
   the input integrated video signal includes the third video signal for controlling the output device,
   the plurality of display devices include a first display device and a second display device,
   the plurality of video signals include a first video signal for causing the first display device to display a first video and a second video signal for causing the second display device to display a second video,
   a display delay time of the first display device is longer than a display delay time of the second display device,
   the second video signal is delayed with respect to the first video signal to make a difference between display timings of the first video and the second video substantially zero, and
   the video display system further comprises an integrated video content generator that generates an integrated video signal by integrating the first video signal and the second video signal, and outputs the integrated video signal to the video conversion device, the integrated video content generator delaying and integrating the second video signal with respect to the first video signal.

2. The video display system according to claim 1, wherein the display delay times is a predetermined value respectively corresponding to the plurality of display devices.

3. The video display system according to claim 1, further comprising an imaging device that captures the plurality of videos respectively displayed by the plurality of display devices, wherein the video conversion device calculates the display delay times based on the plurality of videos captured.

4. The video display system according to claim 1, wherein the video conversion device delays a timing of outputting the second video signal.

5. The video display system according to claim 1, wherein the input integrated video signal is generated based on frame rate information of each of the plurality of display devices.

6. The video display system according to claim 1, wherein the input integrated video signal is generated based on resolution information of each of the plurality of display devices.

7. The video display system according to claim 1, wherein the input integrated video signal is generated with at least one video signal of the plurality of video signals corresponding to a group including at least one display device of the plurality of display devices appearing while being sequentially selectively switched every at least one frame.

8. A video display system comprising:
   a plurality of display devices having mutually different display delay times; and
   a video conversion device that divides an input integrated video signal into a plurality of video signals and respectively outputs the plurality of video signals to the plurality of display devices,
   wherein at least one of the plurality of video signals is output in a delayed state with respect to the other of the plurality of video signals based on the display delay times,
   the plurality of display devices includes an output device controlled by a third video signal,
   the input integrated video signal includes the third video signal for controlling the output device,
   the plurality of display devices include a first display device and a second display device,
   the plurality of video signals include a first video signal for causing the first display device to display a first video and a second video signal for causing the second display device to display a second video,
   a display delay time of the first display device is longer than a display delay time of the second display device,
   the second video signal is delayed with respect to the first video signal to make a difference between display timings of the first video and the second video substantially zero, and
   the video display system further comprises an integrated video content generator that generates an integrated video signal by integrating the first video signal and the second video signal, and outputs the integrated video signal to the video conversion device, the integrated video content generator delaying and integrating the second video signal with respect to the first video signal.

9. A video display method for causing a plurality of display devices having mutually different display delay times to respectively display a plurality of videos, the video display method comprising:
- an information input step of inputting information related to the display delay times;
- a video conversion step of dividing an input integrated video signal into a plurality of video signals; and
- a video output step of outputting the plurality of video signals respectively corresponding to the plurality of videos,
- wherein in the video output step, at least one of the plurality of video signals is output in a delayed state with respect to the other of the plurality of video signals based on the display delay times,
- wherein the plurality of display devices includes an output device controlled by a third video signal,
- the input integrated video signal includes the third video signal for controlling the output device,
- the plurality of display devices include a first display device and a second display device,
- the plurality of video signals include a first video signal for causing the first display device to display a first video and a second video signal for causing the second display device to display a second video,
- a display delay time of the first display device is longer than a display delay time of the second display device,
- the second video signal is delayed with respect to the first video signal to make a difference between display timings of the first video and the second video substantially zero, and
- the video display method further comprises (i) an integrated video content generating step of generating an integrated video signal by integrating the first video signal and the second video signal, (ii) an outputting step of outputting the integrated video signal, and (iii) a video delay and integration step of delaying and integrating the second video signal with respect to the first video signal.

* * * * *